United States Patent
Barnum et al.

(10) Patent No.: US 11,562,366 B2
(45) Date of Patent: Jan. 24, 2023

(54) SYSTEMS AND METHODS FOR AUTHORIZING A TRANSACTION

(71) Applicant: Capital One Services, LLC, McLean, VA (US)

(72) Inventors: Eric K. Barnum, McLean, VA (US); Anthony P. Reynolds, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 171 days.

(21) Appl. No.: 17/021,311

(22) Filed: Sep. 15, 2020

(65) Prior Publication Data

US 2021/0004801 A1    Jan. 7, 2021

Related U.S. Application Data

(63) Continuation of application No. 16/449,019, filed on Jun. 21, 2019, now Pat. No. 10,803,463.

(51) Int. Cl.
| | |
|---|---|
| *G06Q 20/40* | (2012.01) |
| *G06Q 20/20* | (2012.01) |
| *H04L 9/40* | (2022.01) |
| *G06K 19/06* | (2006.01) |

(52) U.S. Cl.
CPC ......... *G06Q 20/405* (2013.01); *G06Q 20/208* (2013.01); *H04L 63/0853* (2013.01); *G06K 19/06028* (2013.01); *G06K 19/06037* (2013.01)

(58) Field of Classification Search
None
See application file for complete search history.

(56) References Cited

U.S. PATENT DOCUMENTS

| | | | | |
|---|---|---|---|---|
| 2004/0254891 A1* | 12/2004 | Blinn | ................... | G06Q 20/12 705/67 |
| 2012/0253852 A1* | 10/2012 | Pourfallah | ........... | G06Q 20/326 705/41 |
| 2013/0018792 A1* | 1/2013 | Casey | ................... | G06Q 40/02 705/44 |

* cited by examiner

*Primary Examiner* — Paul Danneman
(74) *Attorney, Agent, or Firm* — Perkins Coie LLP

(57) ABSTRACT

A system for authorizing a transaction includes one or more processors, and a memory storing instructions. When executed by the one or more processors, the instructions cause the system to perform operations including: receiving a configuration request associated with a financial service account via a web interface; setting a limitation in accordance with the configuration request; and generating a graphic indicium or a card number as a token for authorizing a transaction, associated with the financial service account, which satisfies the limitation in accordance with the configuration request. The token is configured to be printed on a substrate or loaded into an electronic payment system.

20 Claims, 9 Drawing Sheets

SYSTEMS AND METHODS FOR AUTHORIZING A TRANSACTION

CROSS-REFERENCE TO RELATED APPLICATIONS

This application is a continuation of U.S. patent application Ser. No. 16/449,019, filed Jun. 21, 2019. The content of the foregoing application is incorporated herein in its entirety by reference.

TECHNICAL FIELD

The disclosed embodiments generally relate to systems and methods for authorizing a transaction.

BACKGROUND

In modern society, consumer transactions with merchants are generally made by cash, check or payment cards, such as debit cards or credit cards. With the development of technology, debit cards or credit cards provide convenient and speedy payment methods for goods and services at a variety of physical stores, such as clothing stores, grocery stores, restaurants and coffee shops.

However, security concerns arise as the popularity of cashless transactions grows. Debit cards or credit cards may be stolen, or lost by accident, and financial service account holders often face high risks of unauthorized transactions. Thus, there is a need for systems and methods capable of providing a transaction process that reduces risks and losses due to payment card misuse or abuse when authorizing transactions.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments include a system for authorizing a transaction. In some embodiments, the system includes one or more processors, and a memory storing instructions. When executed by the one or more processors, the instructions cause the system to perform operations including: receiving a configuration request associated with a financial service account via a web interface; setting a limitation in accordance with the configuration request; and generating a graphic indicium or a card number as a token for authorizing a transaction, associated with the financial service account, which satisfies the limitation in accordance with the configuration request, in which the token is configured to be printed on a substrate or loaded into an electronic payment system.

The disclosed embodiments also include a method for authorizing a transaction. The method includes: receiving information stored in a graphic indicium or a credit card number as a token, printed on a substrate or loaded in an electronic payment system, and a request to authorize a transaction when the token is scanned at a point-of-sale terminal as the graphic indicium or received by a transaction platform as the card number, in which the token is associated with account information of a financial service account, and a limitation set by a user associated with the financial service account; identifying the limitation in accordance with the information to determine whether the transaction satisfies the limitation; and authorizing the transaction after determining that the transaction satisfies the limitation.

The disclosed embodiments further include a non-transitory computer-readable medium, storing instructions that are executable by one or more processors to perform a method for authorizing a transaction. The method includes: receiving information stored in a token printed on a substrate or loaded in an electronic payment system, the information being associated with a financial service account; transmitting the information and a request to authorize a transaction associated with the financial service account to a server; receiving an authorization result from the server based on the request and a limitation associated with the token, in which the limitation is set by a user; and processing the transaction associated with the financial service account associated with the token in accordance with the authorization result.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
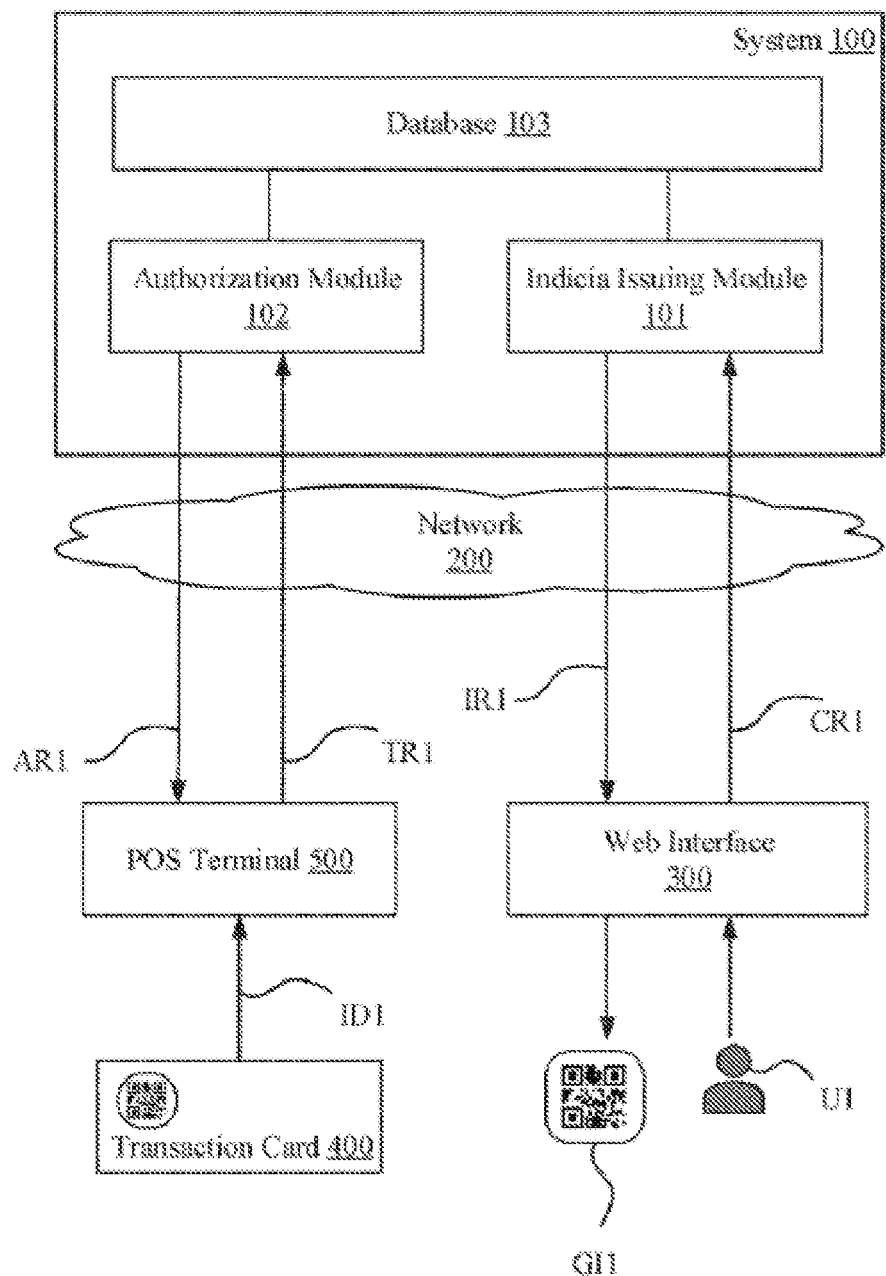
FIG. 1 is a schematic diagram of an exemplary system for authorizing a transaction, consistent with disclosed embodiments.

As cashless transaction becomes more common in daily life, people become more aware of security issues such as risks of payment card misuse. In a current payment system, people typically carry payment cards, such as credit cards or debit cards, issued by banks or other financial service providers, with them to make transactions. There is a risk that the payment cards may be lost or stolen in crowded places or regions with poor public security. Further, current payment methods lack effective security measures to limit damages resulting from payment card misuse or to add user-set limitations to transactions associated with the payment cards. Since behavior and risk tolerance levels vary from person to person, the current payment methods do not meet the need of every consumer.

In some embodiments of the present disclosure, improved systems and methods for authorizing a transaction generate for a user a graphic indicium associated with a financial service account, such as a credit account or a debit account, and with one or more limitations set by the user who holds the financial service account. Thus, the user can define a scope of permitted transactions, associated with the financial service account, based on the one or more limitations, such as date/time, purchase amount, or location of the transaction. The user can make a disposable transaction card, associated with the financial service account and the one or more limitations, by printing the generated graphic indicium on a substrate by himself or herself. The user can then use the disposable transaction card to initiate a transaction by scanning the graphic indicium at a point-of-sale (POS) terminal, for example, in a merchant store.

Thus, the disclosed systems and methods overcome problems of traditional cashless transaction process, such as risks of payment card misuse or abuse, and lack of personalized settings. Accordingly, a cashless transaction process utilizing the improved systems and methods disclosed herein can be more convenient and secure for financial service account holders with user-set transaction rules and limitations. The following disclosure provides exemplary systems and methods for authorizing a transaction for realizing at least some of the above advantages and benefits over conventional systems.

It is noted that terms like "banks" and "financial service providers" are used herein in their broadest sense. Institutions, organizations, or even individuals that process financial transactions may be varied in their organization and structure. The term "financial service provider" is intended to encompass all such possibilities, including but not limited to banks, credit card company or credit unions, financial institutions, finance companies, stock brokerages, savings and loans, mortgage companies, insurance companies, or any other type of financial service entity that generates, provides, manages, and maintains financial service accounts for one or more of customers.

As used herein, the term "payment card" is intended to encompass various means of authenticating transactions, including but not limited to, credit cards and debit cards. The payment card can be electronically linked to one or more financial service accounts belonging to a cardholder, who holds the payment card, at a bank, a financial institution, and/or a financial service provider. Financial service accounts may include debit or credit accounts, or any other deposit accounts.

Reference will now be made in detail to exemplary embodiments, examples of which are illustrated in the accompanying drawings and disclosed herein. Wherever convenient, the same reference numbers will be used throughout the drawings to refer to the same or like parts.

For ease of understanding, in the following description, systems and methods for authorizing a credit card transaction will be discussed in conjunction with accompanying drawings, but the present disclosure is not limited thereto. Systems and methods disclosed herein may also be applied for various payment methods, such as a blockchain payment method, a debit card payment method, or any other suitable payment method. FIG. 1 is a schematic diagram of an exemplary system 100 for authorizing a transaction, consistent with disclosed embodiments. In some embodiments, system 100 for authorizing the transaction includes an indicia issuing module 101, an authorization module 102, and a database 103 communicatively coupled to indicia issuing module 101 and authorization module 102. A financial service account holder, user U1 of an account issued by a financial service provider, can send a configuration request CR1 and set one or more limitations associated with his or her financial service account via a web interface 300. Configuration request CR1 may be in the form of a file, a data package, one or more data packets, or another form of data that contains information associated with the limitation(s) to be set. In response to the configuration request CR1, indicia issuing module 101 can store information of the one or more limitations in database 103 and return an issuance response IR1 to user U1. Indicia issuing module 101 generates and issues a graphic indicium GI1, included in response IR1, for use by user U1 in conducting and obtaining authorization for transactions associated with his or her financial service account. As discussed above, the financial service account may be the credit or debit account associated with a credit card or a debit card.

Web interface 300 may be, for example, a website, a web-based application, a mobile application, a desktop application, and/or other software, running in a personal computer, smartphone, tablet, kiosk system, or other electronic device, which provides a user interface for user U1 to communicate with indicia issuing module 101 to set limitation(s). For ease of understanding, operations regarding web interface 300 will be discussed in detail below in conjunction with FIGS. 4A and 4B.

Graphic indicium GI1 issued by indicia issuing module 101 can be in any of various formats, including one-dimensional barcodes (i.e., linear barcodes) or two-dimensional barcodes (i.e., matrix barcodes, such as a quick response (QR) code). For example, the QR code can be issued as graphic indicium GI1 associated with the financial service account for authorizing transactions. In some embodiments, a color dimension can be introduced in the matrix barcode to generate a three-dimensional barcode as graphic indicium GI1. With additional colors, one pixel in a colored matrix barcode can represent more than two values, which expands a data capacity of graphic indicium GI1. In some embodiments, graphic indicium GI1 contains tokenized financial service account information, such as tokenized credit card or debit card data.

Web interface 300 communicates with indicia issuing module 101 via a network 200. Network 200 may be any type of network that facilitates communications and data transfer between web interface 300 and indicia issuing module 101. For example, network 200 may be a Local Area Network (LAN), a Wide Area Network (WAN), such as the Internet, or may be a single network or a combination of networks, but the present disclosure is not limited thereto. Various types of network can be implemented to allow various entities to exchange data and information.

After graphic indicium GI1 is generated and issued by indicia issuing module 101, user U1 can print graphic indicium GI1 on a substrate using a printer to make a transaction card 400 for conducting transactions. The substrate can be any print media, such as paper, plastic film, metal foil, or a laminate thereof. In some embodiments, user U1 can use a local printer, such as a home printer, connected with a personal computer, smartphone, tablet, kiosk system, or other electronic device that user U1 uses to access web interface 300.

User U1 may use transaction card 400 with graphic indicium GI1 printed thereon at a merchant location to make a purchase. During the purchase, a point of sale (POS)

device 500 can scan graphic indicium Gl1 to transfer identification information ID1 stored in graphic indicium Gl1 to POS terminal 500, and communicate with authorization module 102 of system 100 via network 200 to obtain authorization to complete the transaction.

More particularly, POS terminal 500 may transmit a transaction request TR1 to request authorization of the transaction, including identification information ID1 to authorization module 102 for verifying the identity of user U1. In some embodiments, transaction request TR1 includes a transaction amount and other transaction information, such as a transaction time, a location of the transaction, merchant information, etc.

When authorization module 102 receives transaction request TR1 including identification information ID1, authorization module 102 accesses database 103 to access the financial service account associated with identification information ID1 and determine an authorization result AR1 for responding to transaction request TR1. If the requested transaction satisfies the limitation(s) set by user U1, authorization module 102 returns authorization result AR1 as a purchase approval. Accordingly, authorization module 102 may settle the transaction by transferring funds from the financial service account held by user U1 to an account associated with the merchant.

More particularly, identification information ID1 may include information associated with account information (e.g., credit card number, debit card number, etc.) of the financial service account and information associated with the limitation(s) set by user U1. For example, identification information ID1 may function as a token for accessing database 103. When identification information ID1 is transferred to authorization module 102 via network 200, authorization module 102 may access database 103 and retrieve the account information and the limitation set by user U1 in a table entry corresponding to identification information ID1, as more fully described below.

In some embodiments, the account information and/or limitation(s) can be encoded in graphic indicium Gl1 directly, and POS terminal 500 can decode the graphic indicium Gl1 to retrieve and transmit the account information and/or limitation(s) to authorization module 102. Further, identification information ID1 may include both the account information and the token, which is the same as or similar to the token discussed above, associated with limitation(s). Thus, authorization module 102 can receive the account information and the token decoded by POS terminal 500, and access database 103 to retrieve the corresponding limitation(s) stored in database 103 based on the account information and the token.

While system 100 for authorizing the transaction and transaction card 400 with graphic indicium Gl1 printed on its substrate are depicted and described in relation to transactions that involve customers, merchants, and financial service providers, these entities are used only as an example to illustrate one scenario in which transaction card 400 may be used, and the present disclosure is not limited thereto.

Figure 2:
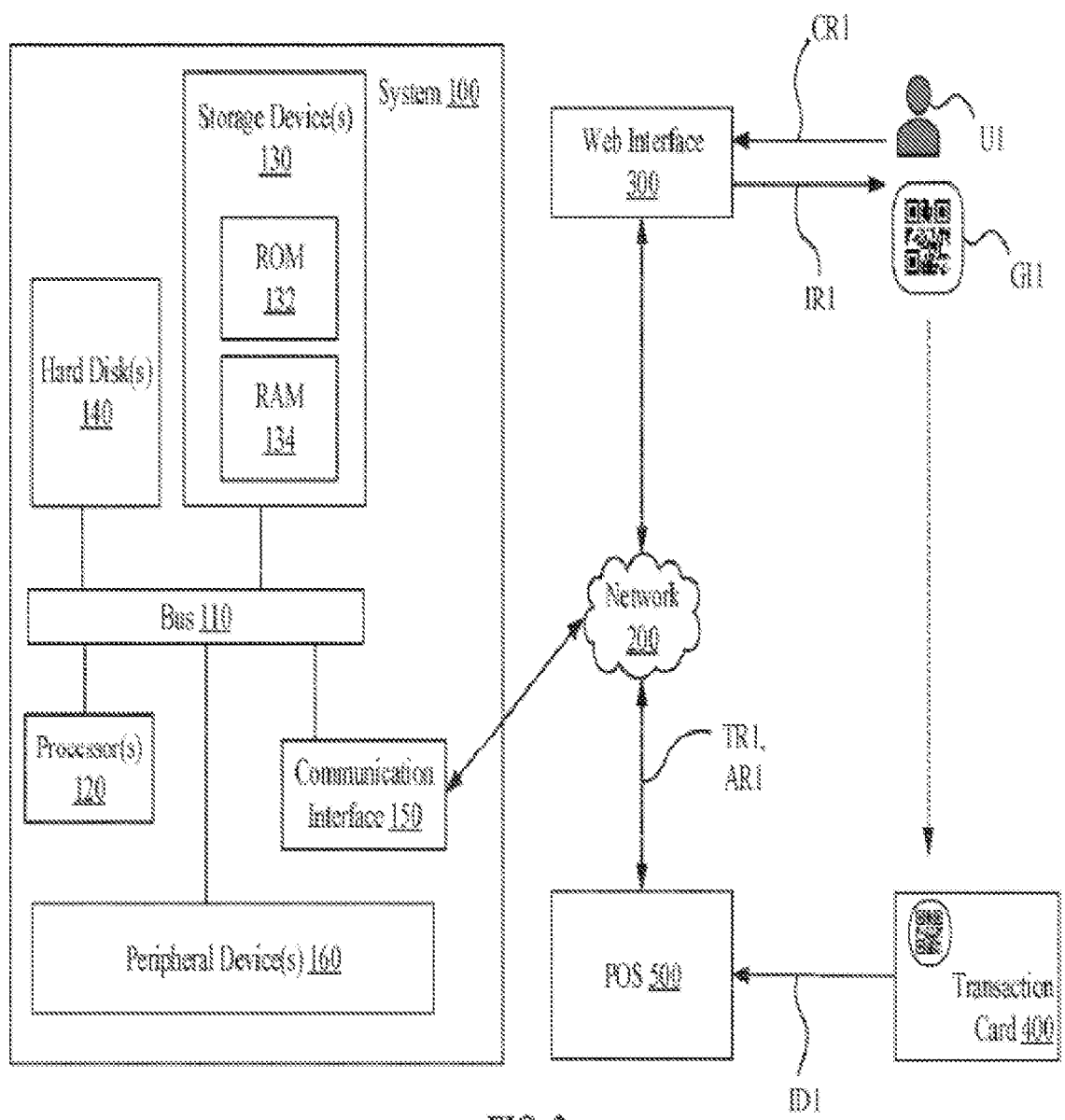
FIG. 2 is a schematic diagram illustrating further aspects of the exemplary system, consistent with disclosed embodiments.

FIG. 2 is a schematic diagram illustrating further aspects of exemplary system 100, consistent with disclosed embodiments. In some embodiments, system 100 may be a server of the financial service provider for authorizing the transaction shown in FIG. 1, but the present disclosure is not limited thereto. In some embodiments, system 100 may be configured as a particular apparatus, system, and the like, based on storage, execution, and/or implementation of software instructions that perform one or more operations consistent with the disclosed embodiments. System 100 may be standalone, or it may be part of a subsystem, which may be part of a larger system. For example, system 100 may represent distributed servers that are remotely located and communicate over a public network (e.g., network 200) or a dedicated network, such as a LAN, for the financial service provider.

As shown in FIG. 2, system 100 includes a bus 110 or other communication mechanism for communicating information, and one or more hardware processor(s) 120 communicatively coupled with bus 110 for processing information. Hardware processor(s) 120 can be, for example, one or more central processors or microprocessors. Bus 110 may be any of several types of bus structures including a memory bus or memory controller, a peripheral bus, and a local bus using any of a variety of bus architectures. By way of example, and without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System 100 further includes one or more storage device(s) 130. Storage device(s) 130 is configured to store data and/or software instructions. Processor(s) 120 retrieves and executes the instructions from storage device(s) 130 to perform operations of indicia issuing module 101 and authorization module 102 consistent with the disclosed embodiments. For example, processor(s) 120 can be configured to execute a set of instructions stored in storage device(s) 130 to cause system 100 to perform a method for authorizing a transaction, including issuing graphic indicium Gl1 and performing identification and authorization when graphic indicium Gl1 is scanned at POS terminal 500 during the transaction.

More particularly, storage device(s) 130 can be various computer-readable media implemented in any method or technology for storage of information such as computer-readable instructions, data structures, program modules or other data. Storage device(s) 130 can be communicatively coupled with processor(s) 120 via bus 110. In some embodiments, storage device(s) 130 may include a main memory, which can be used for storing temporary variables or other intermediate information during execution of instructions by processor(s) 120. Such instructions, after being stored in non-transitory storage media accessible to processor(s) 120, render system 100 into a special-purpose machine that is customized to perform operations specified in the instructions. In some embodiments, system 100 can also be implemented using customized hard-wired logic, one or more ASICs or FPGAs, firmware, or program logic that in combination with a computer system causes or programs system 100 to be a special-purpose machine.

The term "non-transitory media" as used herein refers to any non-transitory media storing data or instructions that cause a machine to operate in a specific fashion. Such non-transitory media can include non-volatile media and/or volatile media. Non-transitory media include, for example, optical or magnetic disks, dynamic memory, a floppy disk, a flexible disk, hard disk, solid state drive, magnetic cassettes, magnetic tape, or any other magnetic data storage medium, a CD-ROM, digital versatile disks (DVD) or any other optical data storage medium, a Random Access Memory (RAM), a read-only memory (ROM), a Programmable Read-Only Memory (PROM), a EPROM, a FLASH-EPROM, NVRAM, flash memory, or other memory technology and/or any other storage medium with the same functionality that can be contemplated by persons of ordinary skill in the art to which this disclosure pertains.

In embodiments consistent with system 100 shown in FIG. 2, storage device(s) 130 includes a memory, which includes computer-readable media in the form of volatile and/or nonvolatile memory such as read only memory (ROM) 132 and random access memory (RAM) 134. A basic input/output system (BIOS) containing the basic routines that help to transfer information between elements within system 100 may be stored in ROM 134. Additionally, RAM 132 may contain an operating system (OS), applications, other programmable code, and programs. RAM 132 may contain data and/or program modules that are accessible to and/or presently being operated on by processor(s) 120.

The disclosed embodiments are not limited to separate programs or computers configured to perform dedicated tasks. For example, storage device(s) 130 may store a single program or multiple programs. Additionally, system 100 may execute one or more programs located remotely from system 100. For example, system 100 may access one or more remote programs stored in a remote component (such as a database) that, when executed, perform operations consistent with the disclosed embodiments. In addition, other components known to one of ordinary skill in the art may be included in system 100 to process, transmit, provide, and receive information consistent with the disclosed embodiments.

In some embodiments, system 100 may also include other removable/non-removable, volatile/nonvolatile computer media. By way of example, FIG. 2 illustrates a hard disk 140 that reads from or writes to non-removable, nonvolatile magnetic media. In some embodiments, system 100 may also include a memory device that may be an optical disk drive or a magnetic disk drive that reads from or writes to a removable, nonvolatile storage medium such as an optical disk or magnetic disk. Other removable/non-removable, volatile/nonvolatile computer storage media that can be used in exemplary system 100 include, but are not limited to, magnetic tape cassettes, flash memory cards, digital versatile disks, digital video tape, solid state RAM, and solid-state ROM.

Database 103 shown in FIG. 1 can be stored in hard disk 140 and/or storage device(s) 130. In some embodiments, database 103 can also be stored in an external storage device in communication with system 100 via network 200 or any other suitable network. Hard disk 140 and storage device(s) 130 may further include client data, including information about particular customers of the financial service provider, such as client account information, debit card or credit card information, history of purchase or payment transactions, financial statements. Client data may further contain one or more user profiles, including information such as a credit score, an income value, an inquiry number, an annual application number corresponding to individual client accounts.

As discussed above, system 100 can transmit data to and communicate with web interface 300 or POS terminal 500 via network 200. More particularly, a communication interface 150 communicatively coupled with bus 110 is configured to enable system 100 to communicate with network 200. In addition, system 100 can be communicatively coupled to one or more peripheral devices 160 via bus 110. For example, peripheral device(s) 160 may include displays (e.g., cathode ray tube (CRT), liquid crystal display (LCD), touch screen, etc.), input devices (e.g., keyboard, mouse, soft keypad, etc.), and/or other output devices (e.g., speaker, headphone, etc.).

Figure 3:
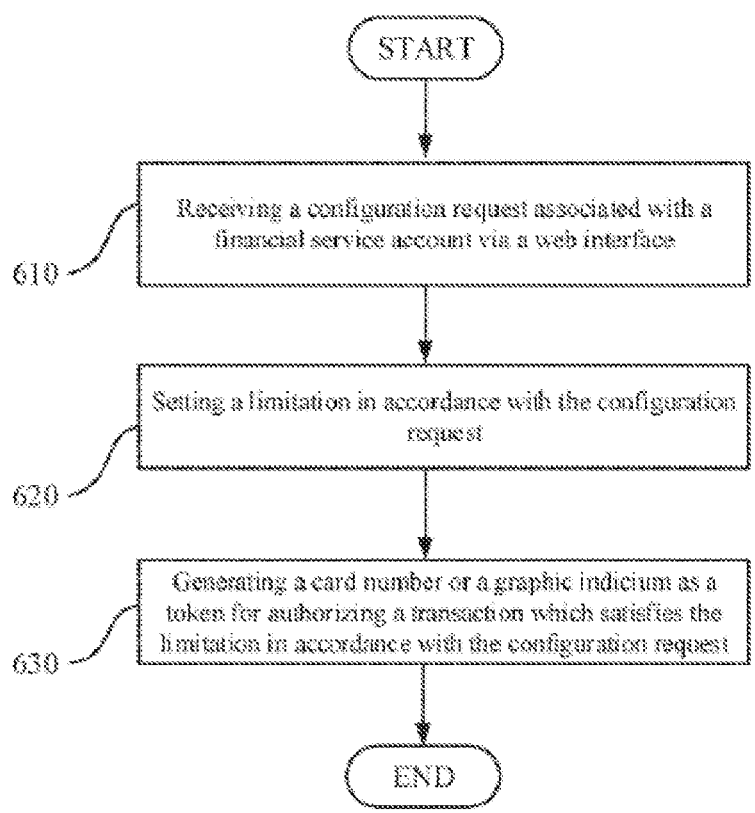
FIG. 3 is a flowchart of an exemplary method performed by the exemplary system for authorizing the transaction, consistent with the disclosed embodiments.

FIG. 3 is a flowchart of an exemplary method 600, consistent with the disclosed embodiments. More particularly, system 100 performs method 600 to issue graphic indicium Gl1 when user U1 accesses web interface 300 to input configuration request CR1. In the following description, reference is made to certain components of FIG. 1 and FIG. 2 for purposes of illustration. It should be appreciated, however, that other implementations are possible, including implementations utilizing components other than those illustrated in FIG. 1 and FIG. 2.

At step 610, system 100 receives configuration request CR1 associated with a financial service account via web interface 300. In some embodiments, user U1 sends configuration request CR1 to system 100 via web interface 300 to determine a scope of one or more future permitted transactions. More particularly, user U1, as the holder of the financial service account, can set one or more limitations on one or more characteristics of the future transaction(s).

At step 620, system 100 sets one or more limitations in accordance with configuration request CR1. In some embodiments, after receiving configuration request CR1 containing information of the scope of permitted transactions determined by user U1, system 100 can store the limitation(s) in database 103. Subsequently, when receiving transaction request TR1 associated with the financial service account, system 100 can access database 103 and identify whether transaction request TR1 satisfies the limitation(s) stored in database 103, in order to determine whether to authorize and settle the transaction or reject the transaction.

At step 630, system 100 generates a card number (e.g., a disposable credit card number) or graphic indicium Gl1 as a token for use by user U1 in conducting and obtaining authorization for transactions associated with the financial service account, which satisfies the limitation(s) in accordance with configuration request CR1. For example, system 100 can assign the disposable credit card number mapping to the account information and the limitation stored in database 103. Then, system 100 encodes the disposable credit card number to generate graphic indicium Gl1. In some embodiments, system 100 can also return to user U1 the disposable credit card number and/or other related detail information associated with the generated disposable credit card number, such as an expiration date and a corresponding card security code (CSC), which is also called card verification value (CVV), card verification code (CVC), etc. Accordingly, user U1 can access, via web interface 300, the disposable credit card number and the corresponding card security code and use them to perform transactions, or load them into an electronic payment system for use in electronic commerce. The electronic payment system may include a smartphone-based or a tablet-based instant payment system, such as Apple Pay, Samsung Pay, etc. Thus, user U1 can later perform online purchases, associated with the token, using the electronic payment system in a smartphone, a tablet, a personal computer, or any other electronic device via a transaction platform. In addition, when performing online purchase(s), user U1 can send the token using the electronic payment system discussed above or can also manually input the generated disposable credit card number, along with the corresponding card security code and expiration date in the transaction platform to initiate the transaction.

Thus, when POS terminal 500 decodes graphic indicium Gl1 and transfers the token to system 100, the account information and the limitation(s) stored in database 103 can be retrieved based on the token. In some embodiments, system 100 can generate a one-dimensional barcode, a two-dimensional barcode such as a quick response (QR)

code, or a three-dimensional barcode as graphic indicium Gl1, but the present disclosure is not limited thereto. Various types of graphic indicia can be implemented in system 100, as long as the generated graphic indicium can be read and decoded by POS terminal 500. As discussed above, in some embodiments, POS terminal 500 may also receive, for example, via the NFC reader, the generated disposable credit card number loaded in an electronic payment system as the token and transfer the token to system 100 accordingly.

In addition, in some embodiments, system 100 may further assign a personal identification number (PIN) code associated with graphic indicium Gl1 for performing a verification when graphic indicium Gl1 is scanned at POS terminal 500. PIN code may be secret number or code known by one or more authorized users of graphic indicium Gl1, but not generally known by others. System 100 may store the relevant graphic indicium Gl1 along with the associated PIN code in a table entry in database 103.

Figure 4A:
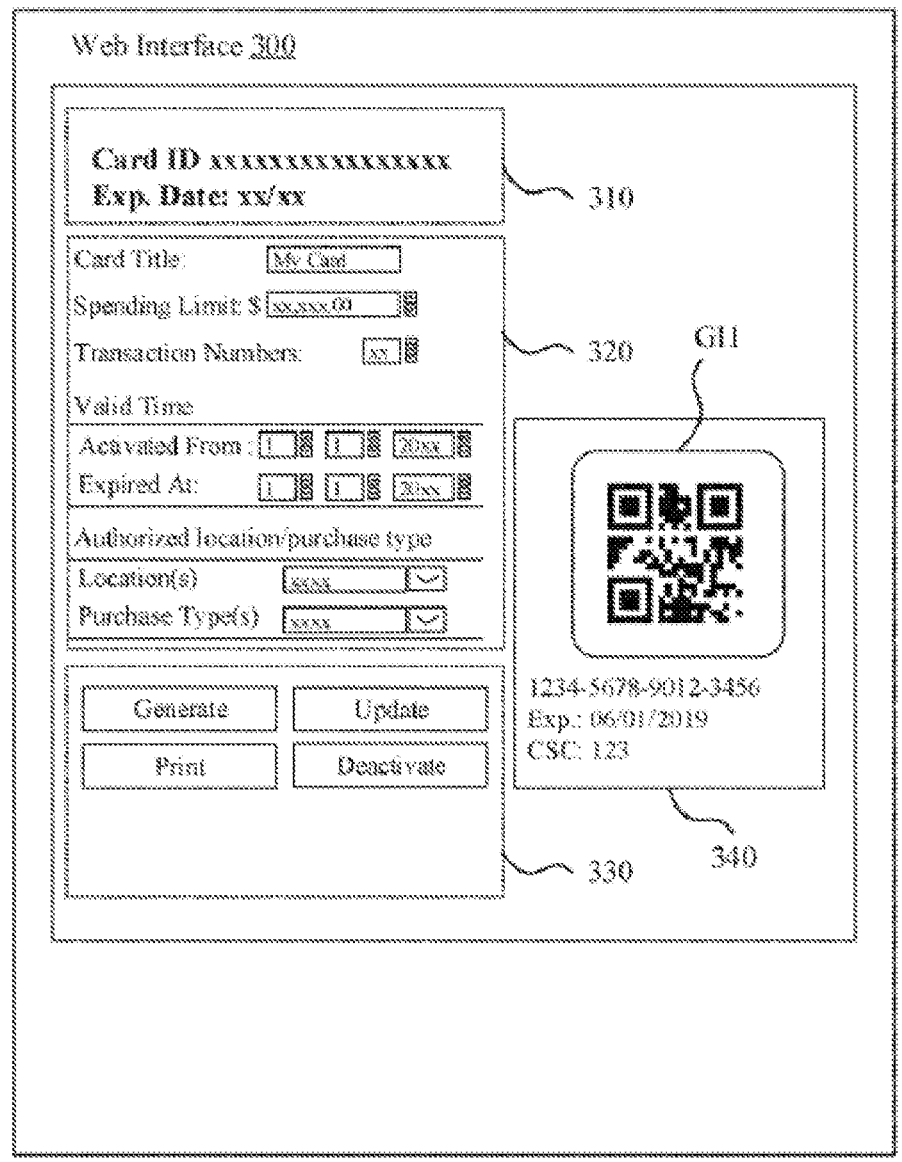
FIGS. 4A and 4B are schematic diagrams illustrating an exemplary web interface, consistent with the disclosed embodiments.
Figure 4B:
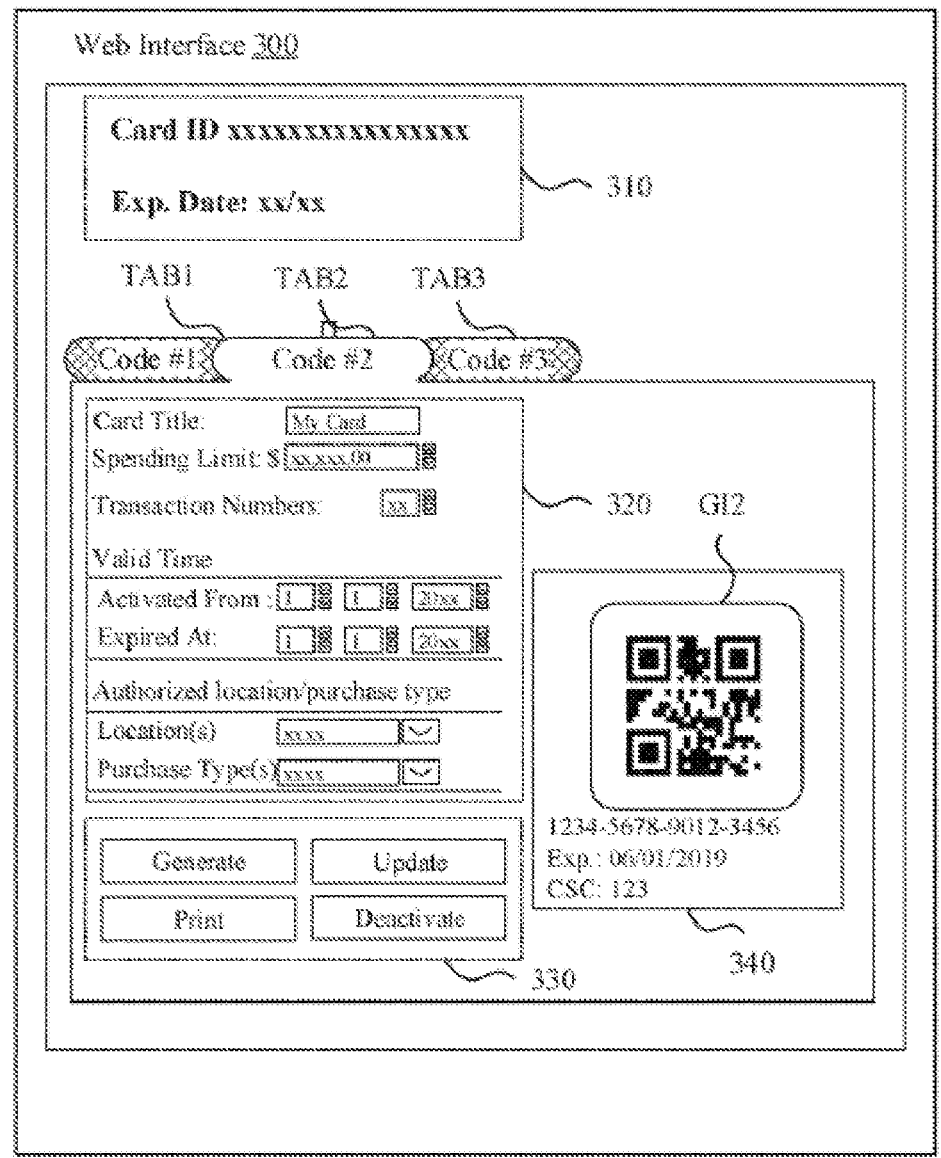

Reference is also made to FIGS. 4A and 4B for further understanding of the embodiments. FIGS. 4A and 4B are schematic diagrams illustrating exemplary web interface 300, consistent with the disclosed embodiments. Web interface 300 can be displayed on a display device of a computer, a laptop, a tablet, a smartphone, or any other suitable electronic devices. User U1 can interact with web interface 300 and input data via an input device, such as a keyboard, a mouse, a touch screen, etc.

As shown in FIG. 4A, in some embodiments, web interface 300 includes regions 310, 320, 330 and 340. Account information is displayed in region 310. For example, account information may include a credit card or a debit card identification (ID) number, expiration date and/or issue date of the credit card or the debit card, a cardholder name on record, a credit limit of the credit card, account balance of the financial service account associated with the credit card or debit card, etc.

User U1 can input preferences and settings in region 320. For example, user U1 can assign a card title or a nickname for a target card using graphic indicium Gl1 generated after the limitation(s) are set. As discussed above, user U1 can set one or more limitations of transactions associated with the financial service account based on one or more characteristics of future transactions. The limitation(s) set here will be applied to future transactions using graphic indicium Gl1. For example, user U1 can set a total spending limit, a maximum payment limit per transaction, a maximum number of transactions, a permitted time period within which the transaction(s) may occur, a permitted location or area of the transaction(s), a permitted merchant list, etc. In some embodiments, user U1 can add one or more new limitations or remove one or more existing limitations in region 320. User U1 can select or assign values to various items, including pop-up menus, input areas, text fields, selecting lists, buttons, checkboxes, etc., in corresponding sections in region 320 to set or update one or more limitations.

Region 330 includes several action buttons. When user U1 clicks on one of the action buttons displayed in region 330, web interface 300 triggers a corresponding action or request and, if necessary, communicates with system 100 to achieve the triggered action. For example, in response to clicking on the "generate" button, web interface 300 sends configuration request CR1 to system 100. In response to the received configuration request CR1, system 100 generates and returns corresponding graphic indicium Gl1 so that web interface 300 displays graphic indicium Gl1 in region 340. As discussed above, in some embodiments, system 100 can also generate and return to user U1 the disposable credit card number and/or other related detail information, such as the expiration date and the corresponding security code so that web interface 300 displays the disposable credit card number and its information in region 340.

Once graphic indicium Gl1 is generated, user U1 may perform various actions associated with graphic indicium Gl1 by clicking corresponding action buttons in region 330. For example, in response to clicking on the "update" button, web interface 300 sends an update request to system 100. In response to the update request, system 100 updates the limitation(s) associated with the generated graphic indicium Gl1 in accordance with the update request. That is, user U1 can change the scope of permitted transactions associated with graphic indicium Gl1, such as increasing or decreasing the total spending limit or the maximum payment limit per transaction, modifying the maximum number of transactions or the permitted time period of the transaction(s), adding or removing permitted locations of the transaction(s), merchant identities, and/or expense categories, etc. In some embodiments, graphic indicium Gl1 remains unchanged with the updated limitations since system 100 can update the account information and/or the limitation stored in database 103 without changing the assigned token for mapping. In some embodiments, system 100 can also assign a new token associated with the updated limitations and accordingly generate and issue a new graphic indicium.

In response to clicking on the "print" button, web interface 300 sends a print instruction to call a print function and initiates printing graphic indicium Gl1 to print transaction card 400 for user U1. In some embodiments, a wired printer connected via a cable or a wireless printer via a wireless connection, such as Bluetooth, WI-FI, etc., can be used to print graphic indicium Gl1.

Accordingly, when a risk of losing a credit card or debit card is high, user U1 can instead carry transaction card 400 with graphic indicium Gl1 printed thereon for authorizing transactions. For example, when attending crowded venues or events, or visiting a foreign country or a region which has poor public security, user U1 can keep the physical credit card or debit card with no user-set limitations at home and bring disposable transaction card 400 with spending limits for use. If disposable transaction card 400 is lost or stolen, the loss is limited by the spending limits set by user U1, i.e., the account holder. Furthermore, instead of using a smartphone to initiate a mobile payment, user U1 can keep the smartphone or other expensive electronic devices safely in a pocket or a bag to avoid being a target of robbery or pickpocketing. Similarly, if user U1 is concerned about the security of a transaction when purchasing online, user U1 can instead use the disposable credit card number to perform the transaction, to prevent the information of the physical credit card or debit card from being leaked.

In response to clicking on the "deactivate" button, web interface 300 sends a termination request to system 100. In response to the termination request, system 100 invalidates graphic indicium Gl1 and, if previously returned to user U1, the disposable credit card number, such that graphic indicium Gl1 and the disposable credit card number are no longer available for authorizing transactions, so that any future transaction will be rejected when the deactivated graphic indicium Gl1 is scanned or the disposable credit card number is received at POS terminal 500. Accordingly, if transaction card 400 with graphic indicium Gl1 printed thereon is lost or stolen, or if the desired transaction is completed, user U1 can timely deactivate graphic indicium Gl1 and the disposable credit card number to prevent unauthorized transactions using transaction card 400.

In some embodiments, user U1, as the account holder, can also set one or more authorized users associated with graphic indicium Gl1 via web interface 300. For example, user U1 can authorize his or her spouse/partner, children, or other people he or she trusts to use graphic indicium Gl1 for transactions. Since user U1 can set or change the scope of permitted transactions associated with graphic indicium Gl1, user U1 can control the spending and avoid improper transactions. For example, user U1 can generate graphic indicium Gl1 to authorize his or her children for short term expenses, such as buying college books or gym clothes. Thus, for example, setting the total spending limit for the transactions associated with graphic indicium Gl1, user U1 can avoid the children improperly using graphic indicium Gl1 for other spending, such as buying luxury goods.

As shown in FIG. 4B, in some embodiments, via web interface 300, user U1 can set different limitations for use of one single financial service account by different users or for different purposes, and respectively generate different graphic indicia (e.g., graphic indicia Gl1, Gl2) associated with different tabs TAB1, TAB2, and TAB3, displayed on web interface 300 respectively corresponding to the different users or different purposes. Accordingly, user U1 can authorize multiple users to use graphic indicia Gl1, Gl2, and Gl3 having different scopes of permitted transactions, and respectively corresponding to tabs TAB1, TAB2, and TAB3. For example, as the account holder, user U1 may reserve TAB 1 and graphic indicium Gl1 for himself or herself. User U1 may further instruct system 100 to issue a second graphic indicium Gl2 for the account holder's spouse for household spending and a third graphic indicium Gl3 for the account holder's son or daughter for educational spending, in which graphic indicia Gl2, Gl3 are respectively associated with limitations for each set by the account holder.

Figure 5A:
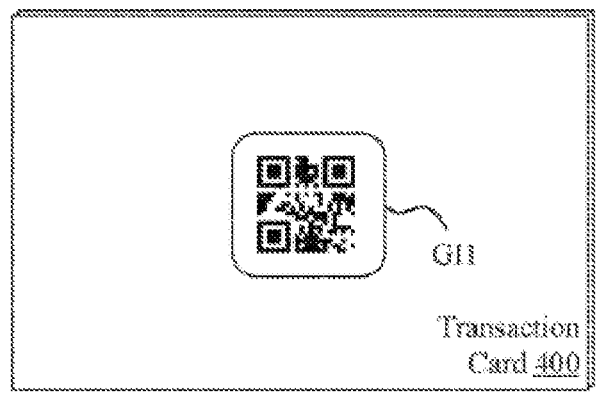
FIGS. 5A and 5B are schematic diagrams illustrating exemplary transaction cards, consistent with the disclosed embodiments.
Figure 5B:

FIGS. 5A and 5B are schematic diagrams illustrating exemplary transaction cards 400, consistent with the disclosed embodiments. As shown in FIG. 5A, in some embodiments, user U1 can print graphic indicium Gl1 on a substrate for transaction card 400 without additional information related to graphic indicium Gl1. As shown in FIG. 5B, user U1 can also choose to print additional information, such as account information, assigned card title, and/or the user-set limitations, on transaction card 400. In some embodiments, system 100 can provide various layout templates for user U1 to customize transaction card 400. For example, user U1 can print out graphic indicium Gl1, along with the disposable credit card number, the card security code, and the expiration date of transaction card 400. Thus, user U1 can load the disposable credit card number in the electronic payment system and perform online purchases accordingly.

As discussed above, transaction card 400 may be disposable. After graphic indicium Gl1 is no longer available for authorizing transactions, user U1 can dispose of or recycle transaction card 400. In some embodiments, since transaction card 400 may contain no or limited privacy or identity information printed thereon, a risk of identity theft can be reduced or minimized. In addition, since the substrate of transaction card 400 can be paper, plastic film, metal foil, or laminate, it is also possible to use a shredder to destroy transaction card 400 with any confidential information printed thereon.

Figure 6:
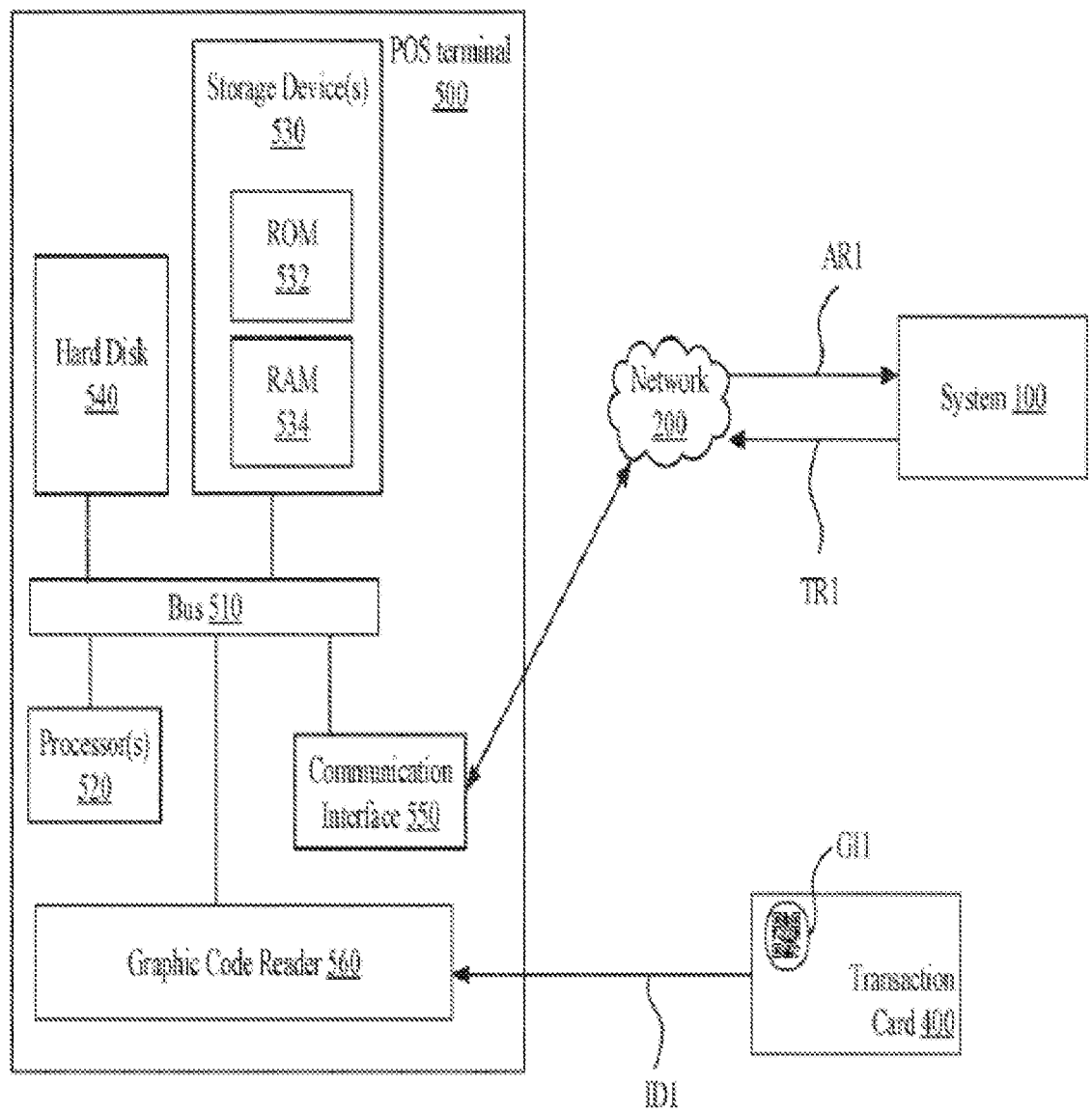
FIG. 6 is a schematic diagram illustrating an exemplary POS terminal, consistent with the disclosed embodiments.

FIG. 6 is a schematic diagram illustrating exemplary POS terminal 500, consistent with the disclosed embodiments. In some embodiments, POS terminal 500 may be part of a payment system in a physical merchant store. POS terminal 500 may be configured as a particular apparatus, system, and the like, based on storage, execution, and/or implementation of software instructions that perform one or more operations consistent with the disclosed embodiments.

As shown in FIG. 6, POS terminal 500 includes a bus 510, one or more hardware processor(s) 520 communicatively coupled with bus 510 for processing information, and one or more storage device(s) 530 communicatively coupled with bus 510 and configured to store data and/or software instructions, so that processor(s) 520 retrieves and executes the instructions from storage device(s) 530. For example, processor(s) 520 can be configured to execute a set of instructions stored in storage device(s) 530 to cause POS terminal 500 to perform a method for authorizing a transaction consistent with the disclosed embodiments, in order to transmit a request to authorize the transaction to system 100 and process the transaction in accordance with an authorization result return from system 100.

In some embodiments, bus 510 may also be any of several types of bus structures including a memory bus or memory controller, a peripheral bus, and a local bus using any of a variety of bus architectures. Hardware processor(s) 520 can be, for example, one or more central processors or microprocessors. Storage device(s) 530 can be various computer-readable media implemented by any method or technology for storage of information such as computer-readable instructions, data structures, program modules or other data.

POS terminal 500 may further include a hard disk 540, a communication interface 550, and a graphic code reader 560. Bus 510, hardware processor(s) 520, storage device(s) 530 including ROM 532 and RAM 534, hard disk 540, and communication interface 550 can be realized by the same or similar hardware components of bus 110, hardware processor(s) 120, storage device(s) 130 having ROM 132 and RAM 134, hard disk 140, and communication interface 150 in system 100 as discussed in detail above. Thus, for the sake of brevity, further detailed discussion of bus 510, hardware processor(s) 520, storage device(s) 530, hard disk 540, and communication interface 550 is not repeated herein.

In some embodiments, graphic code reader 560 may include a barcode reader which can identify QR codes or other types of graphic codes. More particularly, graphic code reader 560 includes a light source and a light sensor configured to translate optical impulses into electrical signals. Graphic code reader 560 can further include decoder circuitry configured to analyze graphic data in the form of electrical signals provided by the light sensor, and send information stored in the scanned decoded graphic code to other components in POS terminal 500 for later processing.

When a purchase is initiated, such as at a checkout terminal, a store clerk operates POS terminal 500 to scan graphic indicium Gl1 on transaction card 400, for authorizing the transaction. In some embodiments, user U1 may also operate POS terminal 500 by himself or herself at a self-checkout terminal. Accordingly, POS terminal 500 can perform a method for authorizing the transaction and communicating with system 100 via network 200 by operation of communication interface 550.

In some embodiments, POS terminal 500 without graphic code reader 560 may also be utilized. In such a scenario, transaction card 400 having credit card information printed thereon can still be used to perform the transaction by, for example, entering the disposable credit card information manually into POS terminal 500. Alternatively, a near field communication (NFC) reader can also be used to receive the disposable credit card information, through the electronic payment system, such as Apple Pay, Samsung Pay, etc.

Figure 7:
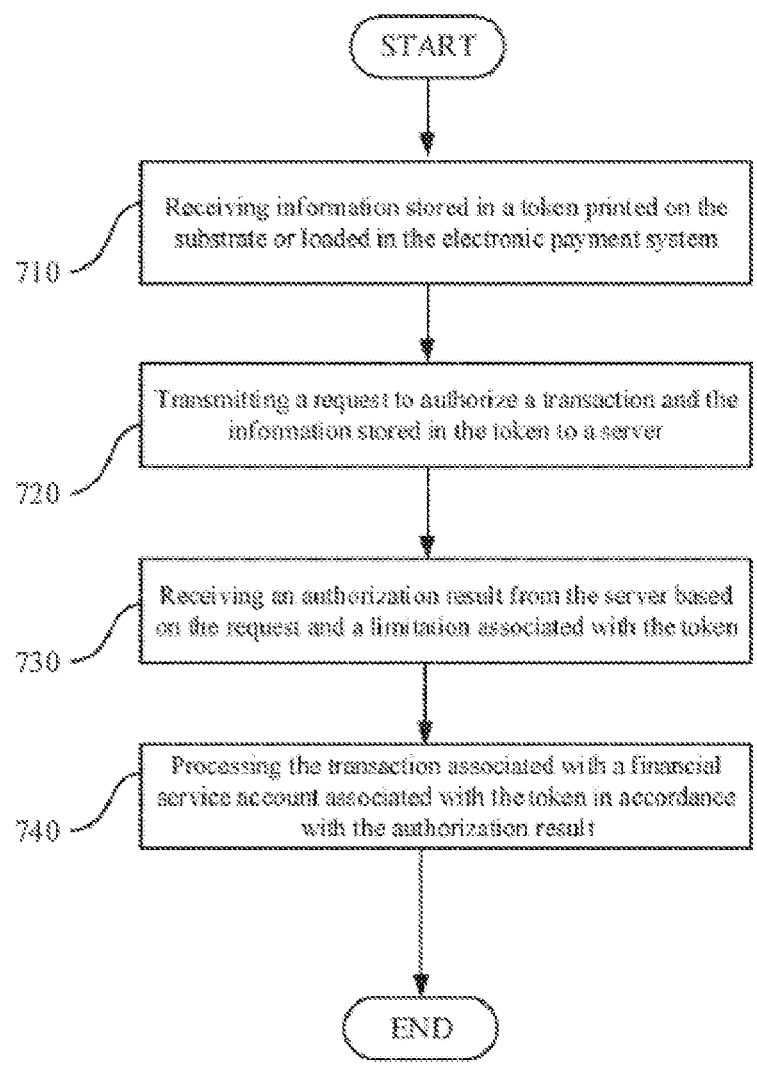
FIG. 7 is a flowchart of an exemplary method performed by the exemplary POS terminal for authorizing a transaction, consistent with the disclosed embodiments.

FIG. 7 is a flowchart of an exemplary method 700 for authorizing the transaction performed by POS terminal 500, consistent with the disclosed embodiments. POS terminal 500 performs method 700 to request approval of the transaction. In the following description, reference is made to certain components of FIG. 1 and FIG. 6 for purposes of illustration. It should be appreciated, however, that other implementations are possible, including components other than those illustrated in FIG. 1 and FIG. 6.

At step 710, POS terminal 500 receives information stored in a token printed on the substrate or loaded in the electronic payment system. For example, POS terminal 500 can control graphic code reader 560 to scan graphic indicium Gl1, printed on the substrate of transaction card 400 to read information (e.g., identification information ID1) stored in graphic indicium Gl1. As discussed above, POS terminal 500 can control graphic code reader 560 to provide a light beam to scan graphic indicium Gl1. The reflected optical impulses are received by the light sensor and translated into electrical signals that are provided to decoder circuitry for analyzing, so as to obtain the information stored in graphic indicium Gl1. In some embodiments, POS terminal 500 can also receive disposable credit card information loaded in the electronic payment system in user U1's phone and perform operations similar to those discussed above.

At step 720, POS terminal 500 transmits, via network 200, a request (e.g., transaction request TR1) to authorize the transaction and the information stored in the token (e.g., graphic indicium Gl1 or disposable credit card information) to a server. In some embodiments, POS terminal 500 transmits the request and the information stored in the token to system 100 which, as noted above, may be a server of a financial service provider. More particularly, POS terminal 500 communicates with authorization module 102 of system 100 via network 200. System 100 can, by operation of authorization module 102, return authorization result AR1 to POS terminal 500 via network 200 in accordance with the request and the information associated with the token.

At step 730, POS terminal 500 receives authorization result AR1 from the server based on the request and the limitation(s) set by user U1 as holder of the financial service account, associated with the token.

At step 740, POS terminal 500 processes the transaction for the financial service account associated with the token in accordance with authorization result AR1. For example, if authorization result AR1 indicates an approval, POS terminal 500 can print out a receipt for the cardholder to sign an authorization to complete the purchase. On the other hand, if authorization result AR1 indicates a rejection, POS terminal 500 can display a reason for rejection or an error code and ask user U1 to reinitiate the transaction with another payment method.

Figure 8:
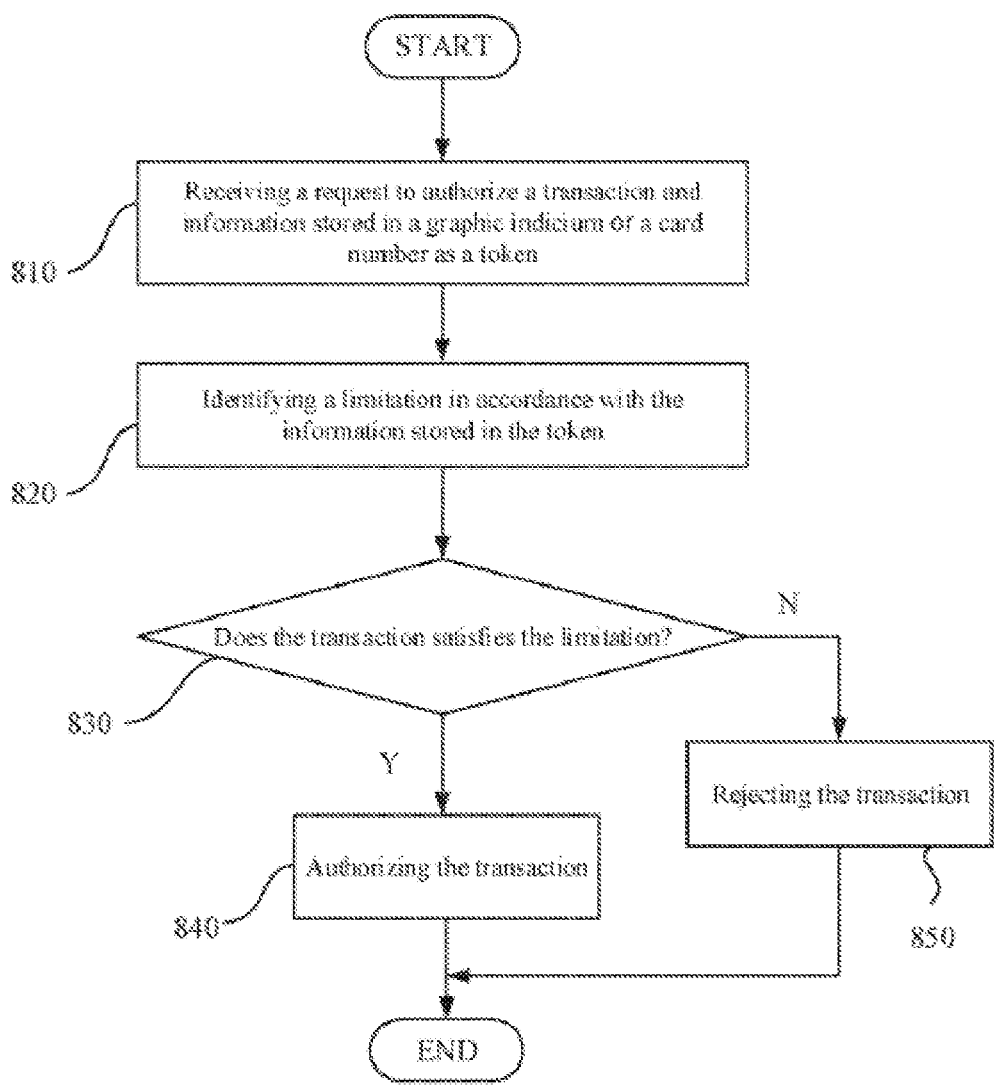
FIG. 8 is a flowchart of an exemplary method performed by the exemplary system for authorizing the transaction, consistent with the disclosed embodiments.

For further understanding of operations of authorization module 102 in system 100 to return the authorization result to POS terminal 500, reference is made to FIG. 8, which is a flowchart of an exemplary method 800 performed by system 100 for authorizing the transaction, consistent with the disclosed embodiments. More particularly, system 100 performs method 800 for the identification and authorization of the transaction when the token (e.g., graphic indicium Gl1) is scanned at POS terminal 500, or the token (e.g., disposable credit card information) is received by a transaction platform. In the following description, reference is made to certain components of FIG. 1 and FIG. 2 for purposes of illustration. It should be appreciated, however, that other implementations are possible, including components other than those illustrated in FIG. 1 and FIG. 2.

At step 810, system 100 receives a request (e.g., transaction request TR1) to authorize a transaction and information (e.g., identification information ID1) stored in graphic indicium Gl1 or a card number (e.g., a disposable credit card number) as a token, printed on the substrate of transaction card 400 or loaded in an electronic payment system, when the token (e.g., graphic indicium Gl1) is scanned at POS terminal 500 or the token (e.g., the disposable credit card number) is received by a transaction platform. As discussed above, the token is associated with account information of the financial service account, and limitation(s) set by user U1 who holds the financial service account.

At step 820 and step 830, system 100 identifies account information of the financial service account and the limitation(s) in accordance with the information stored in the token to determine whether the transaction satisfies the limitation.

In some embodiments, step 820 and step 830 may include identifying a spending limit set included in the limitation(s) and determining whether a transaction amount of the transaction is within the spending limit. System 100 can access database 103 to obtain the total spending limit set for the token, or the maximum payment limit per transaction set for the token. If the transaction amount is within the spending limit, system 100 determines that the request satisfies this limitation. On the other hand, if the transaction amount exceeds the maximum payment limit per transaction, or the sum of spending associated with the token will exceed the total spending limit after the transaction, system 100 determines that the request does not satisfy this limitation.

In some embodiments, step 820 and step 830 may include identifying an active time period of the token set in the limitation(s) and determining whether a transaction time is within the active time period. System 100 can access database 103 to obtain the active time period of the token. If the transaction time, such as the time at which system 100 receives the request, falls within the active time period, system 100 determines that the request satisfies this limitation. On the other hand, if the transaction time is earlier than an activation time or date or later than an expiration time or date, system 100 determines that the request does not satisfy this limitation.

In some embodiments, step 820 and step 830 may include identifying an authorized transaction region set in the limitation(s) and determining whether a location of the transaction is in the authorized transaction region. System 100 can access database 103 to obtain the authorized transaction region and obtain a location of the transaction in accordance with the request from POS terminal 500. If the location of the transaction is within the authorized transaction region, system 100 determines that the request satisfies this limitation. On the other hand, if the location of the transaction is not within the authorized transaction region, system 100 determines that the request does not satisfy this limitation.

In some embodiments, step 820 and step 830 may include identifying a maximum number of transactions set in the limitation(s) and determining whether the number of transactions associated with the token is within the maximum number of transactions when the token is scanned or received to initiate the transaction. More particularly, system 100 can access database 103 to obtain the maximum number of transactions set by the account holder, and a current number of transactions associated with graphic indicium Gl1 or associated with the card number. If the number of transactions already reaches the maximum number of transactions when graphic indicium Gl1 is scanned or the card number is received to initiate the transaction, system 100 determines that the request does not satisfy this limitation. Otherwise, system 100 determines that the request satisfies this limitation. It is noted that, the limitations discussed above are only examples and not meant to limit the scope of the present disclosure.

Accordingly, in response to a determination that the transaction satisfies the limitation (step 830: yes), system 100 performs step 840 to authorize the transaction and return a corresponding authorization result AR1 to POS terminal 500. On the other hand, in response to a determination that the transaction does not satisfy the limitation (step 830: no), system 100 performs step 850 to reject the transaction and return a corresponding authorization result AR1 to POS terminal 500. Further, in some embodiments, if multiple limitations are set by the account holder, system 100 may determine that the request satisfies each limitation in step 830. However, if one or more limitations are not satisfied, system 100 performs step 850 to reject the transaction. Otherwise, system 100 performs step 840 to authorize the transaction.

In addition, in some embodiments, if the PIN code associated with the token is assigned, before authorizing the transaction in step 840, system 100 can return a PIN request to POS terminal 500 or the transaction platform. In response to the PIN request, user U1 is asked to input the PIN code. POS terminal 500 or the transaction platform passes the inputted PIN code to system 100 to verify the user's identity. System 100 receives the PIN code inputted via POS terminal 500 or the transaction platform and checks whether the received PIN code matches the PIN code on file in database 103 for the given token.

In this manner, if there is a match found in database 103, indicating that the PIN code entered is correct, the transaction is authenticated and authorized. Alternatively stated, system 100 performs step 840 to authorize the transaction, in response to a determination that the PIN code assigned to the token is received, and the transaction satisfies the limitation. Otherwise, system 100 performs step 850 rejecting the transaction, such that the transaction is not authorized. By verifying the identity of the account holder using a PIN code, system 100 can further reduce risks and losses resulting from unauthorized transactions.

Accordingly, by performing methods 600 and 800 described above, system 100 can issue the token (e.g., the disposable credit card number or graphic indicium Gl1) and record one or more limitations associated with the token and set by the account holder, so that the token can later be used for authorizing transactions associated with the financial service account of user U1. When graphic indicium Gl1 is scanned or the disposable credit card number is received at POS terminal 500, system 100 can identify the limitation(s), perform an authorization process, and return an authorization result indicating an approval or a rejection of the transaction request accordingly.

In view of the above, systems and methods for authorizing a transaction disclosed in various embodiments of the present disclosure provide a graphic indicium for making disposable transaction card with a customized scope of permitted transactions linked to a corresponding financial service account. A holder of the financial service account can set or change limitation(s) of transactions or terminate a permission to use associated with the graphic indicium or the disposable credit card number. By giving the holder of the financial service authority to manage such transaction settings, the disclosed systems and methods provide protection against risks and losses from payment card misuse or abuse. Further, the disclosed systems and methods also provide flexibility for assigning authorized users to a host credit card and allow the card holder to set the scope of permitted transactions for each authorized user.

The various example embodiments herein are described in the general context of systems, method steps, or processes, which may be implemented in one aspect by a computer program product, embodied in a transitory or a non-transitory computer-readable medium, including computer-executable instructions, such as program code, executed by computers in networked environments. A computer-readable medium may include removeable and nonremovable storage device(s) including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequences of such executable instructions or associated data structures represent examples of corresponding acts for implementing the functions described in such steps or processes.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing drawings and specification, embodiments have been described with reference to numerous specific details that can vary from implementation to implementation. It will be apparent to those skilled in the art that various adaptations and modifications of the described embodiments can be made. Other embodiments will be apparent to those skilled in the art from consideration of the specification and practice of systems and related methods disclosed herein. It is intended that the sequence of steps shown in figures are only for illustrative purposes and are not intended to be limited to any particular sequence of steps. As such, those skilled in the art can appreciate that these steps can be performed in a different order while implementing the same or similar methods. It is intended that the specification and examples be considered as exemplary only, with a true scope being indicated by the following claims and their equivalents.

What is claimed is:

1. A security-based system for facilitating a transaction, the system comprising:
   a computer system that comprises one or more processors programmed with computer program instructions that, when executed, cause the computer system to:
   obtain a request associated with a user account from a client device, the request including a restriction associated with the user account;
   generate a graphic indicium based on the request and the restriction included in the request, the graphic indicium being encoded with the restriction; and
   send the graphic indicium to the client device to facilitate a transaction using the graphic indicium.

2. The system of claim 1, wherein the computer system is caused to:
   obtain a termination request associated with the graphic indicium; and invalidate the graphic indicium in response to the termination request.

3. The system of claim 1, wherein the computer system is caused to:
obtain information associated with the graphic indicium and a request to authorize the transaction, the information including the restriction;
identify the restriction included in the information associated with the graphic indicium;
determine whether the transaction satisfies the restriction; and
authorize the transaction in response to the determination that the transaction satisfies the restriction.

4. The system of claim 3, wherein the information associated with the graphic indicium is obtained in response to a scan of the graphic indicium loaded on the client device.

5. The system of claim 1, wherein the computer system is caused to:
obtain identification information associated with the graphic indicium;
determine whether the obtained identification information corresponds to stored identification information associated with the graphic indicium; and
authorize the transaction in response to the determination that the obtained identification information corresponds to the stored identification information associated with the graphic indicium.

6. The system of claim 1, wherein the restriction includes a restriction on one or more actions conducted with the user account and wherein the restriction is set by a user of the user account.

7. The system of claim 1, wherein the computer system is caused to:
obtain an updated request, the updated request including an updated restriction associated with the user account;
generate a new graphic indicium based on the updated request and the updated restriction included in the updated request, the new graphic indicium being encoded with the updated restriction; and
send the new graphic indicium to the client device to facilitate another transaction using the new graphic indicium.

8. The system of claim 1, wherein the restriction includes a time period associated with the graphic indicium, and wherein the computer system is caused to:
obtain information associated with the graphic indicium and an authorization request to authorize the transaction, the information including the restriction;
identify the time period included in the information associated with the graphic indicium;
determine whether a time of the transaction satisfies the time period; and
authorize the transaction in response to the determination that the time of the transaction satisfies the time period.

9. The system of claim 1, wherein the restriction includes an authorized region associated with the graphic indicium, and wherein the computer system is caused to:
obtain information associated with the graphic indicium and an authorization request to authorize the transaction, the information including the restriction;
identify the authorized region included in the information associated with the graphic indicium;
determine whether a location of the transaction satisfies the authorized region; and
authorize the transaction in response to the determination that the location of the transaction satisfies the authorized region.

10. A method comprising:
obtaining information included in a graphic indicium, the graphic indicium being encoded with a restriction associated with a user account;
obtaining a request to authorize a transaction associated with the graphic indicium;
identify the restriction included in the information associated with the graphic indicium;
determine whether the transaction satisfies the restriction; and
authorize the transaction in response to the determination that the transaction satisfies the restriction.

11. The method of claim 10, further comprising:
obtaining a termination request associated with the graphic indicium; and
invalidating the graphic indicium in response to the termination request.

12. The method of claim 10, wherein the information associated with the graphic indicium is obtained in response to a scan of the graphic indicium loaded on a client device.

13. The method of claim 10, further comprising:
obtaining identification information associated with the graphic indicium;
determining whether the obtained identification information corresponds to stored identification information associated with the graphic indicium; and
authorizing the transaction in response to the determination that the obtained identification information corresponds to the stored identification information associated with the graphic indicium.

14. The method of claim 10, wherein the restriction includes a restriction on one or more actions conducted with the user account and wherein the restriction is set by a user of the user account.

15. The method of claim 10, further comprising:
obtaining an updated request, the updated request including an updated restriction associated with the user account; and
generating a new graphic indicium based on the updated request and the updated restriction included in the updated request, the new graphic indicium being encoded with the updated restriction.

16. The method of claim 10, wherein the restriction includes a time period associated with the graphic indicium and the information includes the restriction, the method further comprising:
identifying the time period included in the information associated with the graphic indicium;
determining whether a time of the transaction satisfies the time period; and
authorizing the transaction in response to the determination that the time of the transaction satisfies the time period.

17. The method of claim 10, wherein the restriction includes an authorized region associated with the graphic indicium and the information includes the restriction, the method further comprising:
identifying the authorized region included in the information associated with the graphic indicium;
determining whether a location of the transaction satisfies the authorized region; and
authorizing the transaction in response to the determination that the location of the transaction satisfies the authorized region.

18. One or more non-transitory, computer-readable media storing instructions that, when executed by one or more processors, effectuate operations comprising:
- obtaining information associated with a graphic indicium, the graphic indicium being encoded with a restriction associated with a user account and the information including the restriction;
- sending the restriction included in the information associated with the graphic indicium and a request to authorize a transaction associated with the graphic indicium to a server;
- obtaining an authorization from the server based on the request, the authorization being obtained in response to a determination by the server that the transaction satisfies the restriction; and
- processing the transaction in response to the obtained authorization.

19. The non-transitory, computer-readable media according to claim 18, further comprising:
- obtaining identification information associated with the graphic indicium;
- sending the identification information to the server; and
- obtaining the authorization from the server in response to a determination by the server that the obtained identification information corresponds to a stored identification information associated with the graphic indicium.

20. The non-transitory, computer-readable media according to claim 18, wherein the information associated with the graphic indicium is obtained in response to a scan of the graphic indicium loaded on a client device.

* * * * *